UNITED STATES PATENT OFFICE.

WILLIAM DONALD, OF SALTCOATS, SCOTLAND, ASSIGNOR OF ONE-HALF TO ROBERT MAIN, OF STEVENSTON, SCOTLAND.

PROCESS OF MAKING CHLORIN.

SPECIFICATION forming part of Letters Patent No. 570,624, dated November 3, 1896.

Application filed February 21, 1896. Serial No. 580,240. (No specimens.) Patented in England May 30, 1895, No. 10,713.

*To all whom it may concern:*

Be it known that I, WILLIAM DONALD, analytical and practical chemist, of Canal Street, Saltcoats, Ayr, Scotland, have invented certain new and useful improvements in treating chlorids for the production of chlorin and alkalies or alkaline earths and the recovery of by-products, (for which I have obtained Letters Patent of Great Britain No. 10,713, dated May 30, 1895,) of which the following is a specification.

This invention has for its object the production of chlorin and of alkalies, such as soda and potash, as hydrate or in other form, from the corresponding alkaline chlorids, as also of certain by-products, by a simple and inexpensive process of treatment.

Under this invention common salt, or rock-salt, and the black oxid of manganese, intimately incorporated, are treated with a mixture of nitric acid and water. The relative quantities of the salt, manganic oxid, nitric acid, and water should be proportioned to the purity of the salt and the required decomposition. For example, equal parts, by weight, of salt and peroxid of manganese may be incorporated and a sufficiency of nitric acid of 68° Twaddell or 1.34° specific gravity may be used to decompose the whole or part of the salt. The particular oxid of manganese intended to be used is the peroxid, ($MnO_2$.) When the mixture of common salt, manganic peroxid, and dilute nitric acid react upon each other and chlorin is evolved, the chemical equation may be stated thus:

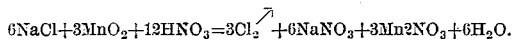

$$6NaCl + 3MnO_2 + 12HNO_3 = 3Cl_2 + 6NaNO_3 + 3Mn2NO_3 + 6H_2O.$$

Heat is applied and the chemical reactions take place at temperatures between 15° and 120° centigrade. Chlorin, charged with varying small proportions of moisture, is evolved, and there is left a residual product consisting of nitrate of soda, nitrate of manganese, water, and free nitric acid. The residual product is evaporated and roasted. In this operation the nitrates are decomposed, with formation of watery vapors and oxids of nitrogen. The removal of the last traces of the nitrates may be assisted by the further addition of manganic oxid. When the resulting residue is evaporated, the water ($6H_2O$) is expelled, and during the roasting the nitrates are decomposed. The $6H_2O$ and the oxids of nitrogen are collected in the oxidizing-tower, already charged with a mixture of nitric acid and water. With the assistance of air-blowing, nitric acid is reformed to be used over again. The nitrates of soda and manganese in the presence of free manganic peroxid are reduced to oxid of sodium and manganous oxid. The change takes place at temperatures between 135° and 250° centigrade. The reactions and equations may be shown thus:

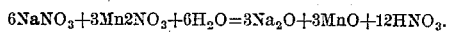

$$6NaNO_3 + 3Mn2NO_3 + 6H_2O = 3Na_2O + 3MnO + 12HNO_3.$$

On treating this residue with water the $3Na_2O$ is decomposed, forming sodium hydrate. At the same time the manganous oxid is hydrated, thus:

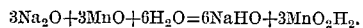

$$3Na_2O + 3MnO + 6H_2O = 6NaHO + 3MnO_2H_2.$$

The gaseous products of decomposition are conveyed into known oxidizing-towers, and by the addition of air by air-blowing converted into nitric acid and water. The residue, resulting from the roasting, consists of a compound of soda and a compound of manganese. This is dissolved in water while hot or treated with water and steam, and air is blow in, with the object of raising the manganese to a higher form of oxidation; and on blowing in air through the aqueous mixture of caustic alkali and manganous oxid, oxygen is absorbed and the manganese converted to the state of peroxid. This oxidation is best effected by a temperature of 70° to 80° centigrade, and steam is used for this purpose. The reaction occurring may be shown thus:

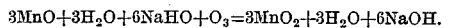

$$3MnO + 3H_2O + 6NaHO + O_3 = 3MnO_2 + 3H_2O + 6NaOH.$$

The caustic soda, which is in solution, is withdrawn and may be carbonated with carbonic acid to form sodium carbonate or bicarbonate, or it may be concentrated or otherwise used for any of the purposes to which caustic soda is applied in the arts and manufactures.

The peroxidized manganese is deposited, washed, dried, and again used for a fresh operation.

Instead of sodium chlorid there may be employed any other alkaline chlorid, as, for example, barium chlorid, potassium chlorid, calcium chlorid, magnesium chlorid, or other chlorid or mixture of these, in which case the corresponding caustic alkali or alkaline earth would be produced.

In cases where the caustic alkali may not be so soluble as that of soda or of potash, for instance, lime and magnesia, the manganese contained in the roasted residue may be treated for oxidation by the hot-air method. That is, the substance is contained in shallow trays and exposed to the action of heated air. This mixture of caustic lime and peroxidized manganese may now be employed for treating ammonium chlorid. Calcium chlorid and manganic oxid is produced and may now be treated with nitric acid and water for the production of chlorin.

In lieu of black oxid of manganese cobaltic oxid, nickelic oxid, or other metallic oxid capable of parting with part of its oxygen to form water, of setting the chlorin free, and of combining with the alkali may in some cases be used.

The chlorin may be generated in an ordinary stoneware still or other suitable apparatus, such as a trickling-tower, kept at the required temperature by an external application of heat.

The evaporating and roasting may be conducted in an arrangement of furnace or furnaces after the manner of a blind roaster or muffle salt-cake furnace, preferably with a mechanical means for the continuous motion of the charge throughout the operation.

Having now described the invention, what I desire to claim and secure by Letters Patent is—

1. The process of manufacturing chlorin, consisting in treating, under heat, an alkaline chlorid and manganic oxid with nitric acid and water, peroxidizing and recovering the manganese by roasting the residual product dissolving in water, blowing in air and finally separating the manganic oxid by deposition, substantially as set forth.

2. The herein-described process of treating alkaline chlorids for the production of chlorin, and the recovery as by-products of nitric acid and the alkalies contained in the chlorids, the said process consisting in decomposing by heat, a mixture of the chlorid and manganic oxid with nitric acid and water to produce chlorin-gas, evaporating and roasting the residual product to decompose the nitrates and evolve oxids of nitrogen which are by oxidation converted into nitric acid, dissolving the furnaced residual product in water and blowing in air to peroxidize the manganese and recovering the caustic alkali by separation from the manganese, substantially as described.

Signed at Glasgow, in the county of Lanark, Scotland, this 29th day of January, 1896.

WILLIAM DONALD.

Witnesses:
WALLACE FAIRWEATHER,
JNO. ARMSTRONG, Jr.